(12) United States Patent
Sano et al.

(10) Patent No.: US 8,454,099 B2
(45) Date of Patent: Jun. 4, 2013

(54) WHEEL FOR VEHICLE

(75) Inventors: Tetsu Sano, Tokyo (JP); Yoshinobu Sakashita, Tokyo (JP); Kei Takagi, Tokyo (JP); Kikuya Ito, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 363 days.

(21) Appl. No.: 12/738,695

(22) PCT Filed: Oct. 17, 2008

(86) PCT No.: PCT/JP2008/068868
§ 371 (c)(1),
(2), (4) Date: Jun. 24, 2010

(87) PCT Pub. No.: WO2009/051229
PCT Pub. Date: Apr. 23, 2009

(65) Prior Publication Data
US 2010/0289323 A1 Nov. 18, 2010

(30) Foreign Application Priority Data
Oct. 19, 2007 (JP) .................. 2007-272008
Oct. 17, 2008 (JP) .................. 2008-268174

(51) Int. Cl.
*B60B 3/04* (2006.01)
(52) U.S. Cl.
USPC ................. 301/63.103; 301/64.101
(58) Field of Classification Search
USPC ............. 301/63.101, 63.103, 63.104, 63.105, 301/63.107, 63.108, 64.101
See application file for complete search history.

(56) References Cited

U.S. PATENT DOCUMENTS

| | | | |
|---|---|---|---|
| 1,711,833 | A | 5/1929 | Crissman |
| 2,159,880 | A | 5/1939 | Kelsey-Hayes Wheel |

(Continued)

FOREIGN PATENT DOCUMENTS

| | | |
|---|---|---|
| EP | 1 262 333 | 3/2003 |
| JP | S57-134301 | 8/1982 |

(Continued)

OTHER PUBLICATIONS

Notice of Allowance corresponding to U.S. Appl. No. 12/738,698 dated Nov. 30, 2010.

(Continued)

*Primary Examiner* — Kip T Kotter
(74) *Attorney, Agent, or Firm* — Jenkins, Wilson, Taylor & Hunt, P.A.

(57) ABSTRACT

A wheel for vehicle comprising: a rim 2 having a drop portion; and a disk 10 formed integrally from a plate material, the rim and the disk being welded together, wherein the disk has: a hub mounting portion 10*a*; a plurality of spokes 10*b* radially extending from the hub mounting portion toward an outer periphery of the disk; and a ring-shaped disk flange 10*c* that is connected to the spokes through a curved-surface connecting portion R that is formed by bending the spokes at an outer circumferential end thereof in a wheel axial direction, the disk flange extends in the wheel axial direction, and a decorative hole 20 is defined by the adjacent spokes, the hub mounting portion, and the disk flange, and a part that faces a distal end 12 of the spoke in a fitting area between an inner circumferential surface of the rim and an outer circumferential surface of the disk flange is welded.

13 Claims, 9 Drawing Sheets

U.S. PATENT DOCUMENTS

| | | | |
|---|---|---|---|
| 3,391,439 A | | 7/1968 | Bulgrin et al. |
| 4,504,095 A | * | 3/1985 | Edwards et al. ......... 301/63.104 |
| 5,388,330 A | | 2/1995 | Daudi |
| 7,059,685 B2 | * | 6/2006 | Kermelk et al. ......... 301/64.101 |
| 7,104,611 B2 | * | 9/2006 | Alff et al. ................. 301/63.107 |
| 7,469,973 B2 | * | 12/2008 | Coleman et al. ......... 301/63.107 |
| 7,895,752 B2 | | 3/2011 | Sano et al. |
| 7,922,260 B2 | * | 4/2011 | Rodrigues ................ 301/63.101 |
| 2003/0080608 A1 | * | 5/2003 | Coleman et al. ......... 301/63.103 |
| 2004/0227392 A1 | * | 11/2004 | Coleman et al. ......... 301/64.101 |
| 2006/0071539 A1 | | 4/2006 | Sereno |
| 2007/0175037 A1 | | 8/2007 | Coleman et al. |
| 2007/0222279 A1 | * | 9/2007 | Csapo et al. ............. 301/64.101 |
| 2010/0253134 A1 | | 10/2010 | Sano et al. |

FOREIGN PATENT DOCUMENTS

| | | |
|---|---|---|
| JP | 58-032001 | 3/1983 |
| JP | 63-108924 | 5/1988 |
| JP | H03-5602 | 1/1991 |
| JP | 09-095101 | 4/1997 |
| JP | 11254901 A * | 9/1999 |
| JP | 2004-1704 | 1/2004 |
| JP | 2004-243925 | 9/2004 |
| JP | 2005-035330 | 2/2005 |
| JP | 2005-119355 | 5/2005 |
| JP | 2006-275536 | 10/2006 |
| JP | 2007-191025 | 8/2007 |
| JP | 2007-272008 | 10/2007 |
| JP | 2007-302178 | 11/2007 |
| JP | 2008-114723 | 5/2008 |
| JP | 2009-113798 | 5/2009 |
| JP | 2009-113799 | 5/2009 |
| JP | 2009-190607 | 8/2009 |
| WO | WO03/043836 | 5/2003 |
| WO | WO2007/089750 | 8/2007 |
| WO | WO2009/051229 | 4/2009 |
| WO | WO2009/051230 | 4/2009 |
| WO | WO2012/022319 | 1/2012 |

OTHER PUBLICATIONS

Notification of Transmittal of Translation of the International Preliminary Report on Patentability (Chapter I or Chapter II of the Patent Cooperation Treaty) corresponding to International Patent Application No. PCT/JP2008/068869 dated May 20, 2010.

Written Opinion corresponding to International Patent Application No. PCT/JP2008/068869 dated Jan. 20, 2009.

Written Opinion corresponding to International Patent Application No. PCT/JP2008/068868 dated Jan. 20, 2009.

Decision to Grant a Patent corresponding to Japanese Patent Application No. 2012-522618 dated Jul. 30, 2012.

International Search Report corresponding to International Patent Application No. PCT/JP2011/064667 dated Sep. 27, 2011.

International Search Report corresponding to International Patent Application No. PCT/JP2008/068868 dated Jan. 20, 2009.

Japanese Industrial Standard JIS D 4103:1998 "Automobile parts—Disc Wheels—Performance requirements and marking".

Notification and Transmittal of Translation of the International Preliminary Report of Patentability (Chapter I or Chapter II of the Patent Cooperation Treaty) corresponding to International Patent Application No. PCT/JP2008/068868 dated May 20, 2010.

Notification of Transmittal of Translation of the International Preliminary Report on Patentability (Chapter I and Chapter II of the Patent Cooperation Treaty) corresponding to International Patent Application No. PCT/JP2008/068869 dated May 20, 2010.

* cited by examiner

WHEEL FOR VEHICLE

FIELD OF THE INVENTION

The present invention relates to a wheel for vehicle such as automobiles, agricultural vehicles, and industrial vehicles.

DESCRIPTION OF THE RELATED ART

Cheap and low-cost steel wheels have been widely used. However, these steel wheels have a problem with their poor design, compared to aluminum wheels. Thus, in recent years, steel wheels having thin spokes and large decorative holes have been developed to provide a similar appearance to aluminum wheels. (See Patent Documents 1 to 3).

According to the description in the Patent Document 1, a stamped disk is welded to a rim. The stamped disk has spokes formed integrally with a ring portion extending along the entire circumference of the stamped disk. A notch is provided on the ring portion, such that the notch does not interfere with an air stem (valve hole) on the rim when the ring portion is seated on a shoulder portion of the rim to be welded together.

According to the description in the Patent Document 2, a periphery of each decorative hole is subjected to drawing to form a raised wall so as to secure sufficient strength, thereby reducing the width of the spokes which are provided between the adjacent decorative holes. The disk is formed with a disk flange in the circumferential direction, and the disk flange is welded to a rim.

According to the description in the Patent Document 3, a single piece of metal sheet is formed into a disk, and the disk includes a plurality of spokes units and a ring-shaped disk edge that connects the outer ends of the spoke units together. Also according to the Patent Document 3, each of the spoke units includes two spoke bars (reinforcing ribs), and the disk edge is positioned on an inner circumference of a rim well (drop portion) to be joined together.

[Patent Document 1] Japanese Unexamined Patent application Publication No.-2004-1704.
[Patent Document 2] Japanese Unexamined Patent application Publication No. 2005-119355.
[Patent Document 3] European Patent No. 1262333 (Claims 1 and 3).

Problems to be Solved by the Invention

In accordance with the art described in the Patent Document 1, the notch is provided on the ring portion of the disk. However, this creates a problem of productivity. Also, the art described in the Patent Document 2 must involve mounting a wheel cap (decorative cap) onto the wheel. This makes it necessary to further improve the design of the wheel itself.

In the case that the disk includes those integrally-formed thin spokes and large decorative holes, the ring portion (disk flange or disk edge) has, at its decorative-hole portion, the smallest width, and thus has the lowest strength. This can cause the decorative-hole portion to be deformed by forming and machining the disk, and thus can cause an end edge of the ring portion to undulate. Therefore, welding the ring portion at its decorative-hole portion results in poor welding and insufficient joint strength.

The present invention has been made to solve the above problems. The object of the present invention is to provide a wheel for vehicle including: a rim; and a disk that has integrally-formed spokes and large decorative holes and that is welded to the rim, wherein the wheel for vehicle is manufactured with higher productivity, reduction of poor welding, and sufficient joint strength.

SUMMARY OF THE INVENTION

To achieve the above object, the present invention provides a wheel for vehicle comprising: a rim having a drop portion; and a disk formed integrally from a plate material, the rim and the disk being welded together, wherein the disk has: a hub mounting portion; a plurality of spokes radially extending from the hub mounting portion toward an outer periphery of the disk; and a ring-shaped disk flange that is connected to the spokes through a curved-surface connecting portion that is formed by bending the spokes at an outer circumferential end thereof in a wheel axial direction, the disk flange extends in the wheel axial direction, and a decorative hole is defined by the adjacent spokes, the hub mounting portion, and the disk flange, and a part that faces a distal end of the spoke in a fitting area between an inner circumferential surface of the rim and an outer circumferential surface of the disk flange is welded.

By this, since the curved-surface connecting portion positioned at an extending portion of the spoke has a larger material width and thus has higher strength, an end edge of this portion is less likely to undulate due to the bending. Thus, by welding the fitting surface facing the distal end of the spoke corresponding to this position, poor welding is reduced while ensuring reliable welding. And a force is transmitted from the rim to the hub mainly through the spokes. When a part of the disk flange adjacent to the decorative holes has a small material width, the force is hardly transmitted through this part of the disk flange. Therefore it is inefficient to weld that part of the disk flange, as substantially no improvement in wheel strength will result. Hence, by welding the fitting surface facing the distal end of the spoke, the efficiency of the welding and the productivity are improved.

And the present invention provides a wheel for vehicle comprising: a rim having a drop portion; and a disk formed integrally from a plate material, the rim and the disk being welded together, wherein the disk has: a hub mounting portion; a plurality of spokes radially extending from the hub mounting portion toward an outer periphery of the disk; and a ring-shaped disk flange that is connected to the spokes through a curved-surface connecting portion that is formed by bending the spokes at an outer circumferential end thereof in a wheel axial direction, the disk flange extends in the wheel axial direction, and a decorative hole is defined by the adjacent spokes, the hub mounting portion, and the disk flange, and a part that is adjacent to the decorative hole in a fitting area between an inner circumferential surface of the rim and an outer circumferential surface of the disk flange is welded.

A force is transmitted normally from the rim to the hub via the rim, the welded part, the disk flange, the spokes, and the hub mounting portion in the described order. Therefore, in the case that the spokes are too rigid, by welding the disk flange except a part that faces the distal end of the spoke, a less-rigid part of the disk flange than the distal end of the spoke can be welded. As a result, the stress concentration is relaxed, and thus fatigue endurance of the welded part and its adjacent area is improved.

Preferably, the outer circumferential surface of the disk flange is fitted into the inner circumferential surface of the drop portion of the rim.

In this embodiment, the outer shape of the disk becomes smaller and lighter-weight, compared to the case of fitting the outer circumferential surface of the disk flange into an inner circumferential surface of a bead seat of the rim. Also, the disk flange is easily prevented from interfering with a valve hole.

Preferably, the outside part in the wheel axial direction of the fitting area is welded.

Since the rotating disk is deformed into an elliptical shape, stress is applied in the radial direction of the disk, causing the fitting area between the disk and the rim to be widened. In this embodiment in which the outside part of the fitting area is welded, the stress is merely exerted directly on the welded part of the outside part of the fitting area. Therefore, the lower stress is applied to the welded part compared to the case of welding an inside part of the fitting area.

Preferably, the inside part in the wheel axial direction of the fitting area is welded.

In this embodiment, the welded part is difficult to see externally and the appearance of the wheel is improved.

Preferably, the outside end edge being adjacent to the decorative hole in the wheel axial direction of the disk flange is located inside relative to the outside end edge in the wheel axial direction of the drop portion.

In this embodiment, the disk flange is retracted inside in the wheel axial direction relative to the rim. The outside end edge of the disk flange is difficult to see externally. Thus, the spokes look as if they connect directly to the rim and the design characteristics of the wheel is improved.

The present invention provides a wheel for vehicle including: a rim; and a disk that has integrally-formed spokes and large decorative holes and that is welded to the rim, wherein the wheel for vehicle is manufactured with improved productivity, reduction of poor welding, and sufficient joint strength.

DESCRIPTION OF THE PREFERRED EMBODIMENTS

Embodiments of the present invention will be described below. In the following description, a steel wheel is applied as an example. However, the present invention covers not only the steel wheel, but also other material (for example, titanium and titanium alloy) wheels, as long as a disk is formed from a circular plate blank by bending an outer periphery of the blank by drawing or the like to form a disk flange.

In contrast, aluminum, magnesium, and other materials have lower material strength than the steel. Thus, casting is generally used for such aluminum, magnesium or other material to be integrally formed into a thick disk. For this approach, the structure for welding the disk and the rim together is not a problem. The present invention therefore does not cover the above thick disk that is integrally formed by casting (forging).

Preferably, the wheel of the present invention meets the official standard for fatigue strength. However, the present invention may also be applied to the wheels which have no official standard for fatigue strength to meet, such as wheels for industrial (agricultural) vehicles and spare wheels for emergency use (including temporary wheels for vehicle).

It should be noted that the official standard for fatigue strength refers to Japanese Industrial Standards (JIS) D 4103 "Automobile parts—Disk wheel—Performance requirements and marking," and however, if the JIS D 4103 is subject to modification in the future, the official standard for fatigue strength will refer to the modified official wheel fatigue strength provided by JIS (and/or International Standards Organization (ISO)) at the time of the modification.

Figure 1:
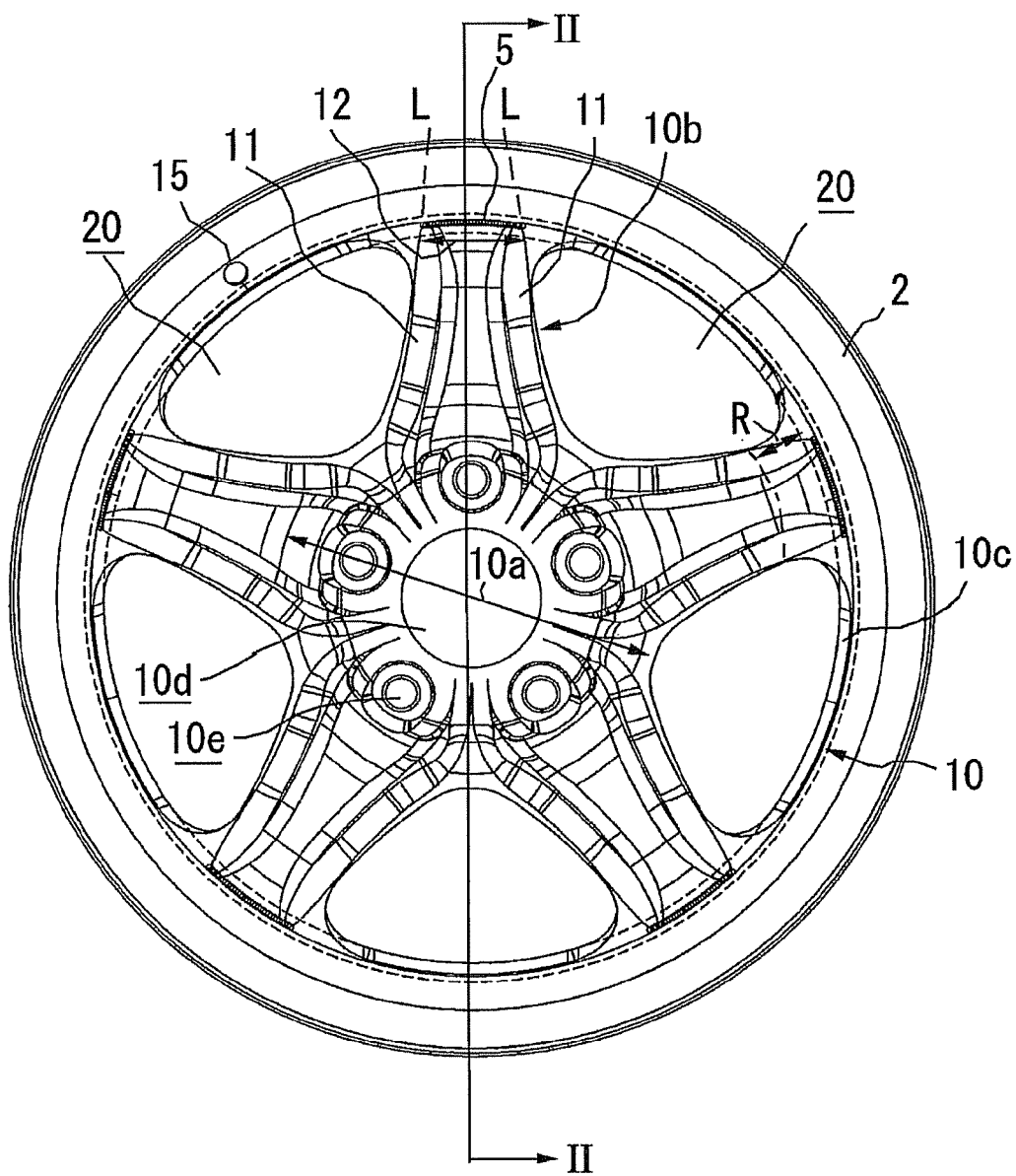
FIG. 1 is a front view showing an example of a steel wheel for vehicle according to a first embodiment of the present invention.

FIG. 1 is a front view showing a wheel for vehicle according to a first embodiment of the present invention. The (steel) wheel for vehicle according to the embodiment of the present invention includes a steel rim 2 and a steel disk 10, in which the disk 10 is fitted into the rim 2 at its drop portion 2c to weld the disk 10 and the rim 2 together.

Figure 2:
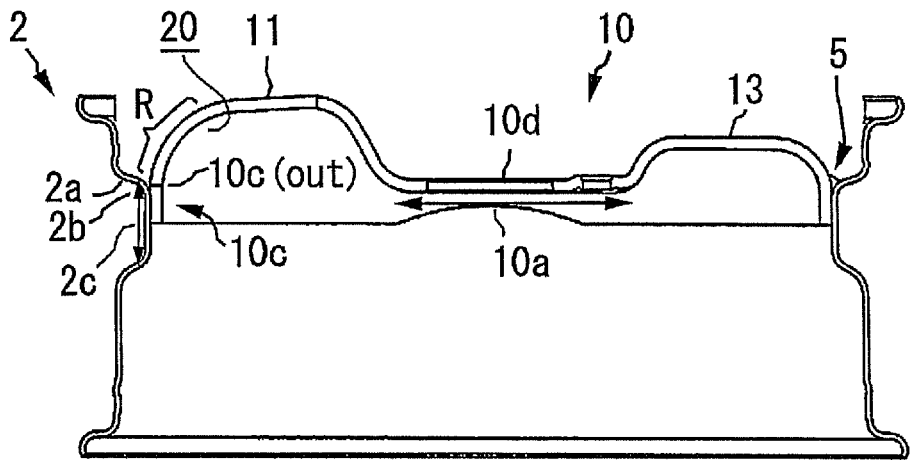
FIG. 2 is a sectional view taken along the line II-II in FIG. 1.

It should be noted that in the following description, a term "outside" and a term "inside" respectively refer to an outer part and an inner part of the wheel mounted on the vehicle, when viewed in the wheel axial direction. In a double-tire structure of a truck in which two axially-connected wheels are used, the term "outside" and the term "inside" for an inner one of the wheels respectively refer to, as described above. In contrast, the term "outside" and the term "inside" for the other outer wheel respectively refer to an inner part and an outer part of the wheel. The reason for this is that in the double-tire structure, the outer wheel is turned inside out to be connected to the inner wheel. For example, in the case of the inner wheel, an upper part of the disk shown in FIG. 2 is oriented outside, while in the case of the outer wheel, a lower part of the disk shown in FIG. 2 is oriented outside.

The radial direction of the rim and the disk is represented as "inward" or "outward."

In FIG. 1, the rim 2 is in a substantially cylindrical shape, and is designed to house a tire between an outside flange and an inside flange that are formed on the both ends of the rim 2.

The disk 10 is integrally formed from a steel plate. The disk 10 has a central hub hole 10d and a plurality of bolt holes 10e that are located circumferentially outward of the hub hole 10d and concentrically with the hub hole 10d. The bolt holes 10e are used to mount the hub. A substantially disk-shaped area of the disk 10, on which the hub hole 10d and the bolt holes 10e are formed, is hereinafter referred to as a hub mounting portion 10a.

Five long pieces of spokes 10b extend radially from the hub mounting portion 10a toward an outer circumferential edge of the disk. Each of the spokes 10b has two reinforcing portions 11, 11 that are formed along the both widthwise ends of the spoke 10b and that extend in the longitudinal direction (circumferentially outward direction). The reinforcing portions 11, 11 each include a first reinforcing part 11a and a second reinforcing part 11b (see FIG. 3). The second reinforcing part 11b is raised from the middle of the spoke 10b toward the outside of the wheel to connect to the first reinforcing part 11a. The first reinforcing part 11a extends substantially parallel to the hub mounting portion 10a to form an end edge of the spoke 10b.

The spoke 10b is bent at its outer circumferential end toward the inside of the wheel to form a curved-surface connecting portion R. The spoke 10b is connected to a ring-shaped disk flange 10c through the curved-surface connecting portion R. The disk flange 10c extends in the wheel axial direction. The disk flange 10c extends in the wheel axial direction and forms a fitting surface to be fitted into the rim 2 in the axial direction. The disk flange 10c has a function of connecting the individual spokes 10b together to ensure sufficient strength.

Five substantially-triangle decorative holes 20 are formed, each of which is defined by the two adjacent spokes 10b, 10b, a part of an outer circumferential end of the hub mounting portion 10a, and a part of an outside end of the disk flange 10c. The decorative holes 20 are generally designed to reduce the weight and radiate heat.

A distal end 12 of the spoke is defined as an area between the contact points where two extended lines L, L of the widthwise ends of the spoke 10b contact with the rim 2 (the drop portion 2c in this embodiment). A part that faces a distal end 12 in a fitting area between an inner circumferential surface of the rim 2 (the drop portion 2c), which will be described later, and an outer circumferential surface of the disk flange 10c is welded to form a welded part 5.

The rim 2 has a valve hole 15 on its side wall (located circumferentially outward of the drop portion). However, the valve hole 15 is not interfered with the disk 10 since the disk and the rim are welded together at the drop portion of the rim as illustrated in FIG. 2. Thus, there is no need for the disk 10 to be provided with a notch.

FIG. 2 is a sectional view taken along the line II-II in FIG. 1. In FIG. 2, inside of the outside flange of the rim 2, an outside bead seat is formed in which a tire bead is seated. Inside of the outside bead seat, a smallest-diameter drop portion 2c is formed. The outside bead seat and (an outside part of) the drop portion 2c are connected to each other smoothly through a side wall 2a. More specifically, the drop portion 2c and the side wall 2a are connected to each other through a bent portion 2b. The bent portion 2b is semi-circular in cross section. An inside bead seat is formed inside of the drop portion 2c through a side wall. The inside bead seat is connected to an inside flange. In the following description, a term "drop portion" refers to an outside part of the drop portion (a connecting part to the outside bead seat).

The rim 2 may be manufactured, for example, by rolling up a rolled shape steel of a predetermined shape into a cylindrical form or by rolling up a steel plate into a cylindrical form and then subjecting the cylindrical steel plate cylinder to roll forming or the like into a predetermined cross sectional shape. However, the present invention is not limited to these manufacturing methods.

The hub mounting portion 10a of the disk 10 substantially lies on a flat plane. In contrast, the spoke 10b extends from the hub mounting portion 10a, bends toward the outside of the wheel, extends outward in the wheel radial direction and substantially parallel to the hub mounting portion 10a, bends toward the inside of the wheel at the curved-surface connecting portion R, and then connects to the disk flange 10c. The widthwise middle portion 13 of the spoke is enclosed by the reinforcing portions 11 of the spoke 10b, and is located further inside of the wheel relative to the reinforcing portions 11.

The disk 10 may be manufactured from, for example, a square steel plate. The manufacture of the disk 10 may include: stamping the square steel plate into a shape having four rounded corners; forming decorative holes on the stamped steel plate; and subjecting the stamped steel plate to drawing (pressing) to bend the plate thereby to form a disk flange. Assuming the case where the disk flange 10c is deformed with its end edge undulating by machining, as will be described later, a blank of anomaly shape may be employed as a disk material, taking the material flow and deformation into account.

Figure 3:
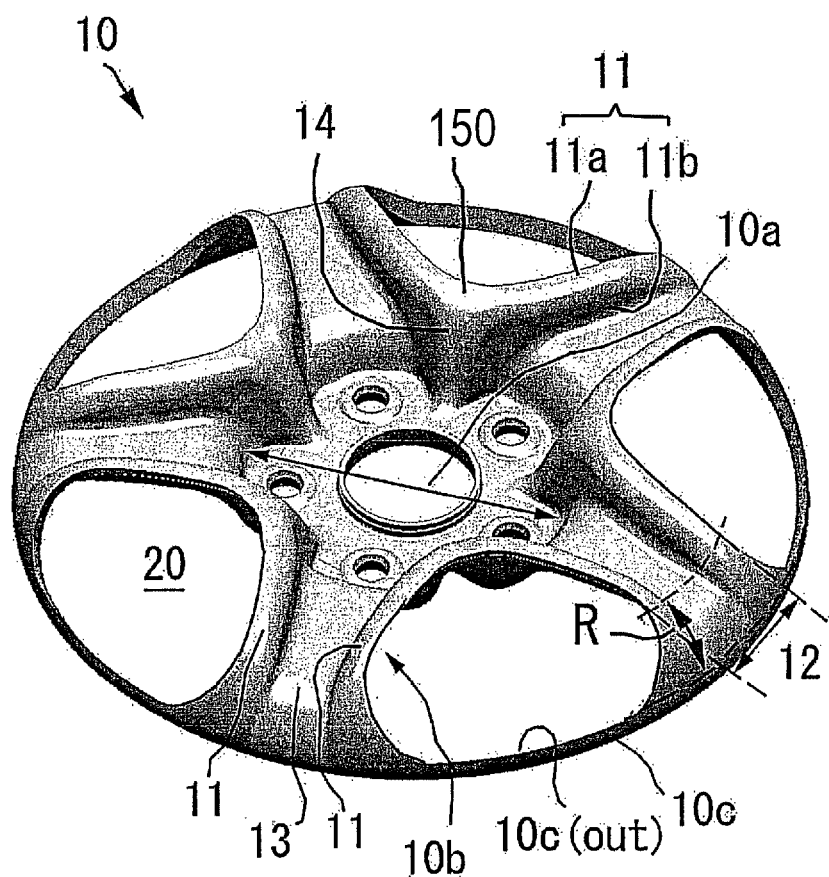
FIG. 3 is a perspective view of a disk.

FIG. 3 is a perspective view of the disk 10. In FIG. 3, a raised portion 14 and a connecting portion 150 are formed on an outer periphery of the hub mounting portion 10a of the disk. The raised portion 14 continues to the second reinforcing part 11b of the spoke 10b and the connecting portion 150 connects to the raised portion 14. These elements are formed together into a rib that encloses the two sides and the apex of the decorative hole 20. The connecting portion 150 extends substantially parallel to the hub mounting portion 10a, and connects between the first reinforcing parts 11a of the adjacent spokes.

The curved-surface connecting portion R widens from its proximal end toward its outer circumferential side, and is connected to the disk flange 10c. Thus, the decorative hole 20 is in the form of a substantially pentagon, when viewed obliquely.

A part that is adjacent to the decorative holes 20 in the disk flange 10c has the smallest material width and thus has the lowest strength. Therefore, when the disk flange 10c is formed by bending, this part of the disk flange 10c can be deformed downward (in the direction of the bending) as shown by the broken line of FIG. 3, causing the end edge of that part of the disk flange 10c to undulate. Thus, welding the ring portion at the decorative-hole portion can result in poor welding and insufficient joint strength.

In contrast, a part that is near the curved-surface connecting portion R positioned at the extending portion of the spoke 10b has a larger material width and thus has higher strength. Therefore, the end edge of this part of the disk flange 10c is less likely to undulate due to the bending. Thus, by welding the fitting surface near the distal end 12 of the spoke, which corresponds to this part of the disk flange 10c, poor welding is reduced while ensuring reliable welding.

A force is transmitted from the rim to the hub mainly through the spokes 10b. When the part of the disk flange 10c adjacent to the decorative holes 20 has a small material width, the force is hardly transmitted through this part of the disk flange 10c. It is inefficient to weld that part of the disk flange 10c, as substantially no improvement in wheel strength will result.

In view of this, by welding the fitting surface facing the distal end 12 of the spoke, poor welding is reduced and the efficiency of the welding and the productivity are improved.

The present invention is not limited to any particular welding method, but may use any welding methods including, for example, laser welding, plasma welding, $CO_2$ arc welding, metal active gas (MAG) welding, submerged arc welding, and tungsten inert gas (TIG) welding. However, in the case that the welded part appears on the outside surface of the wheel, the laser welding, the plasma welding or the TIG welding may be preferably used for providing a more aesthetic appearance to a welded bead surface. Particularly, hot wire TIG welding or the submerged arc welding may be preferred in view of cost, reliable weld strength, and appearance.

The disk flange 10c may extends in the wheel axial direction parallel to the drop portion 2c of the rim. Alternatively, the disk flange 10c may extend with its diameter slightly increasing at the distal end in order to tightly fit the disk flange 10c to the rim 2.

Figure 4:
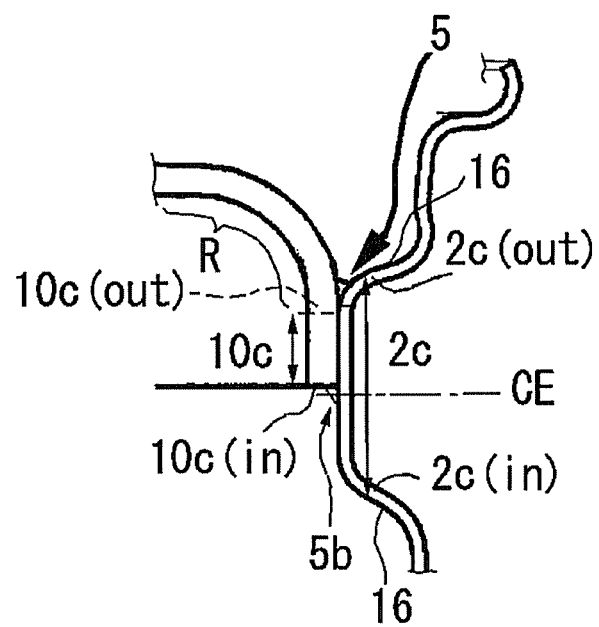
FIG. 4 is an enlarged partial view of FIG. 2.

Fitting and welding between the rim 2 and the disk 10 will be now described with reference to FIG. 4, an enlarged partial view of FIG. 2. In FIG. 4, the outer circumferential surface of the disk flange 10c is fitted into the inner circumferential surface of the drop portion 2c of the rim 2 to form the fitting area. An outside part of the fitting area is welded to form the welded part 5 to join the rim 2 and the disk 10 together.

Welding the outside part of the fitting area results in improved weld strength, compared to welding the inside part (a welded part 5b in FIG. 4) of the fitting area. The conceivable reasons for this are as follows. Since the rotating disk is defaulted into an elliptical shape, stress is applied in the radial direction of the disk (in the lateral direction in FIG. 4), causing the fitting clearance between the disk 10 and the rim 2 to be widened (separate laterally). It is therefore conceivable that in the case of welding the inside part of the fitting area, the stress that causes the fitting clearance to be widened is transmitted from the outside part of the fitting area to the welded part (the welded part 5b in FIG. 4), and the stress to be applied to the welded part increases due to the principle of leverage.

In contrast, in the case of welding the outside part of the fitting area, the stress that causes the fitting clearance to be widened is merely exerted directly on the welded part of the outside part of the fitting area. Therefore, the lower stress is applied to the welded part, compared to the case of welding the inside part of the fitting area.

In the case of welding the inside part of the fitting area, the welded part is preferably displaced toward the outside of the wheel, so that the principle of leverage is less likely to work. That is, an inside end edge 10c (in) of the disk flange is preferably located outside with respect to an axial middle part CE of the drop portion 2c. This allows for even material weight reduction.

It should be noted that the axial middle part CE of the drop portion 2c is represented as a midpoint of a distance between an outside end edge 2c (out) and an inside end edge 2c (in) of the drop portion 2c. Also, it should be noted that the outside end edge 2c (out) and the inside end edge 2c (in) of the drop portion 2c are represented as contact points or inflection points where the inner circumferential rim surface of the drop portion 2c which extends parallel to the wheel axial direction stops curving and contacts with inner circumferential surfaces 16, 16 of the side wall.

As the (axial) length of the fitting area between the disk flange 10c and the rim 2 is excessively reduced, a length of the entire joint structure is insufficient, thereby decreasing the joint strength and causing more runout.

If the inside end edge 10c (in) of the disk flange has an undulating portion, an innermost part of the undulating portion is regarded as an inside end edge 10c (in).

Figure 5:
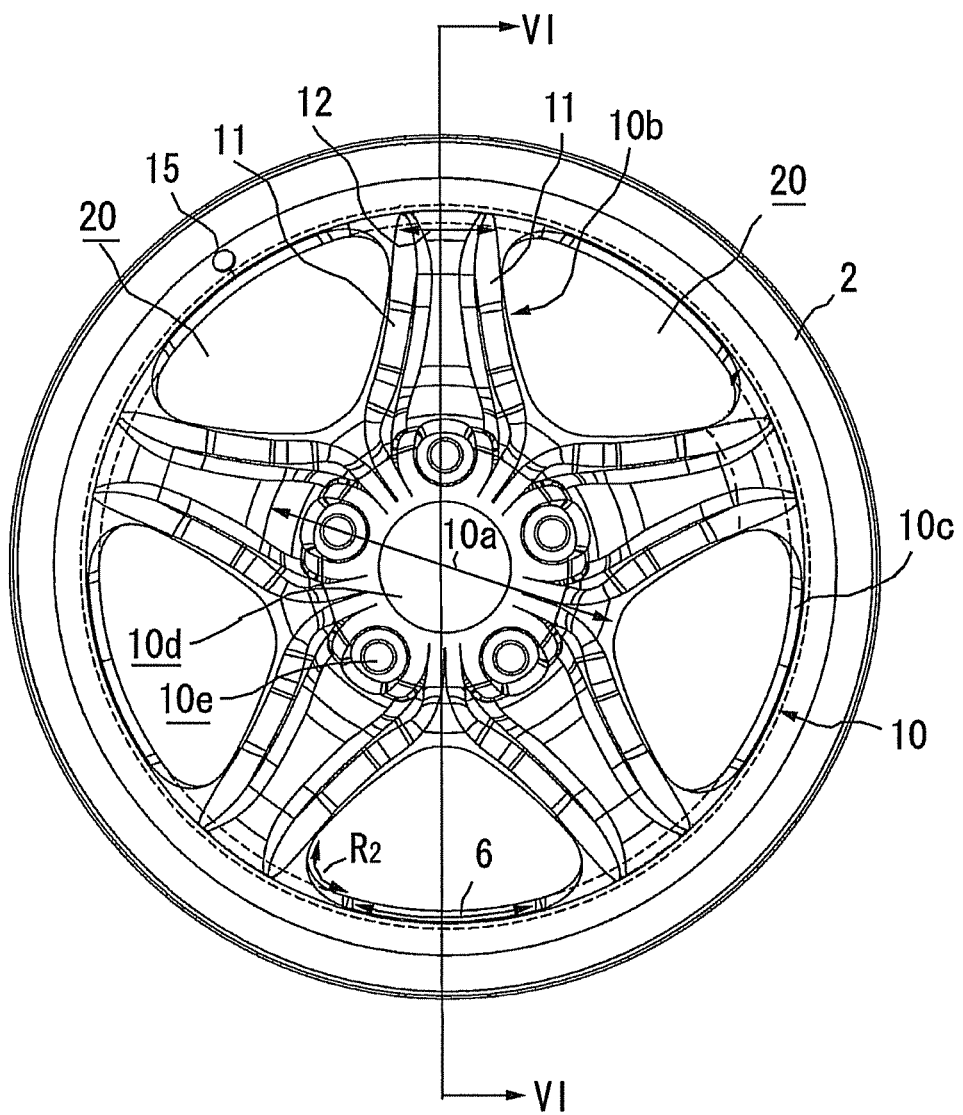
FIG. 5 is a front view showing an example of a steel wheel for vehicle according to a second embodiment of the present invention.

When the outside end edge 10c (out) of the disk flange 10c, wherein the outside end edge being adjacent to the decorative holes 20, is located inside relative to the outside end edge 2c (out) of the drop portion 2c, the disk flange 10c is retracted inside of the wheel relative to the rim 2. Therefore, the outside end edge 10c (out) is difficult to see externally, as shown in FIG. 5. Thus, the spokes look as if they connect directly to the rim and the design characteristics of the wheel is improved.

There can be a case that an intermediate part between the curved-surface connecting portion R and the outside end edge 10c (out) of the disk flange exists parallel to the wheel axial direction, depending on the degree of bending the outer peripheral end of the disk. In this case, the outside end edge 10c (out) of the disk flange is defined as an area adjacent to the decorative holes 20, while the fitting area between the inner circumferential surface of the drop portion and the outer circumferential surface of the disk flange is defined as an area where the outer circumferential surface of the disk flange including aforementioned intermediate part are fitted into the inner circumferential surface of the drop portion.

If the outside end edge 10c (out) of the disk flange has an undulating portion, an outermost part of the undulating portion is regarded as an outside end edge 10c (out).

Figure 6:
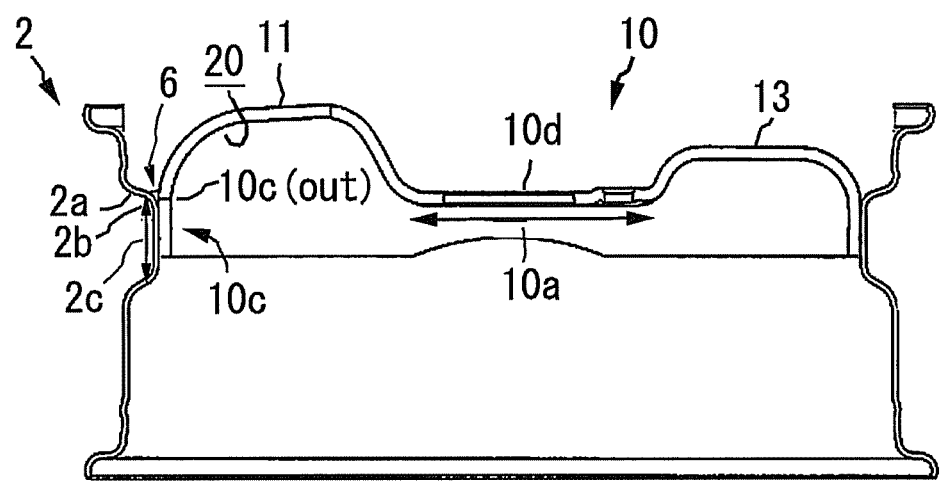
FIG. 6 is a sectional view taken along the line VI-VI in FIG. 5.

FIG. 5 is a front view showing a wheel for vehicle according to a second embodiment of the present invention. The (steel) wheel for vehicle according to the second embodiment of the present invention includes the steel rim 2 and the steel disk 10, in which the disk 10 is fitted into the rim 2 at its drop portion 2c to weld the disk 10 and the rim 2 together. FIG. 6 is a sectional view taken along the line VI-VI in FIG. 5.

The disk flange 10c is wider in the second embodiment than in the first embodiment. In a example as illustrated in FIG. 6, the inside end edge 10c (in) in the wheel axial direction of the disk flange 10c extends beyond the middle part CE of the drop portion 2c to close to the inside end edge 2c (in) of the drop portion. However, ensuring a sufficient width of the disk flange 10c does not always involve extending the inside end edge 10c (in) of the disk flange beyond the middle part CE of the drop portion, as in the case, for example, when the drop portion 2c itself is sufficiently long.

A part that is adjacent to the decorative hole in the fitting area between the inner circumferential surface of the drop portion 2c and the outer circumferential surface of the disk flange 10c is welded to form a welded part 6. It should be noted that the part (of the fitting area) adjacent to the decorative holes is referred to as a fitting area except at least a part that faces the distal end of the spoke. The decorative holes each have a corner R2 that is curved for machining reasons. The width of the disk flange 10c in the corner R2 is wider than the width of the disk flange 10c in the middle portion of the decorative hole. Therefore, the fitting area is preferably welded not only except the part that faces the distal end of the spoke, but also except a part that faces the corner R2 of the decorative hole, from the viewpoint of welding a less-rigid part of the disk flange, as will be discussed later.

An endpoint of the corner R2 of the decorative hole is represented as a point where the corner stops curving. A part of the fitting area, which extends along the decorative hole from the endpoint of the corner R2 via the middle portion of the decorative hole to an endpoint of another corner R2, is preferably welded.

A force is transmitted normally from the rim 2 to the hub (not shown) via the rim 2, the welded part 6, the disk flange 10c, the spokes 10b, and the hub mounting portion 10a in the described order. Therefore, if the distal end 12 of the spoke is welded, stress concentration can occur on the welded part due to the overly rigid spoke. Thus, by welding the fitting area at disk flange 10c, and not at distal end 12 of spoke 10b, the less-rigid part of the disk is welded. This relaxes the stress concentration on the welded part, and thus improves fatigue endurance of the welded part and its adjacent area.

Figure 7:
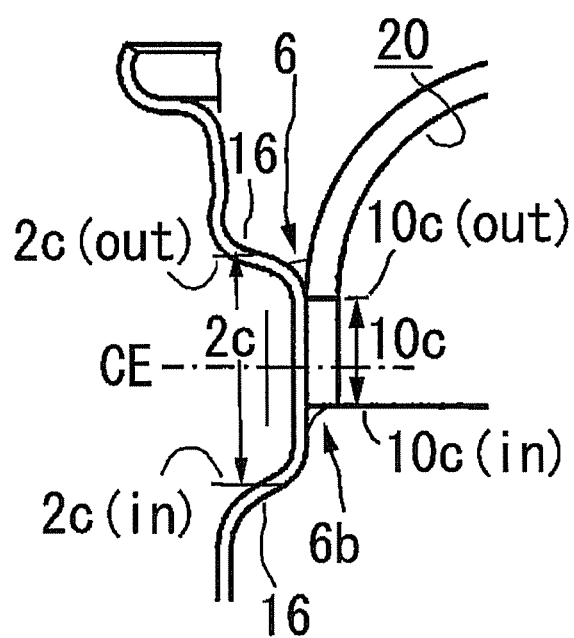
FIG. 7 is an enlarged view of FIG. 6.
Figure 8:
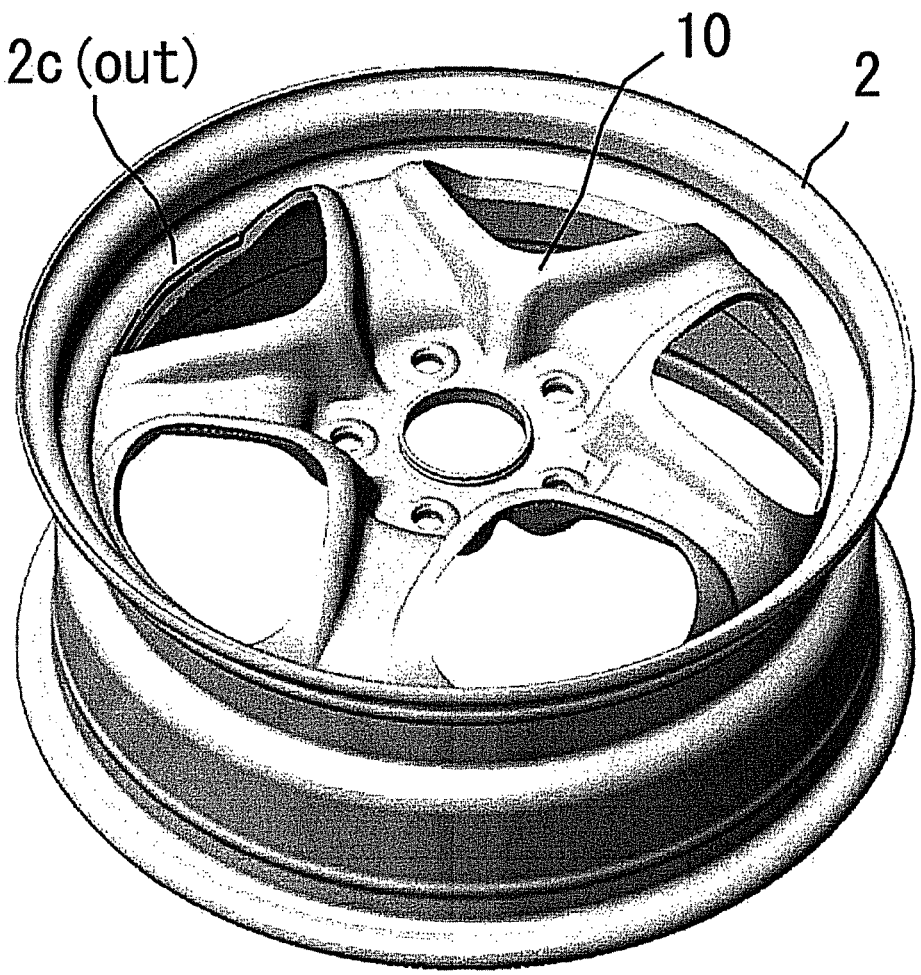
FIG. 8 is a perspective view of a fitting area between a rim and the disk.

Fitting and welding form between the rim 2 and the disk 10 will be now described with reference to FIG. 7, an enlarged partial view of FIG. 6. In FIG. 7, the outer circumferential surface of the disk flange 10c is fitted into the inner circumferential surface of the drop portion 2c of the rim 2 to form the fitting area. An outside part of the fitting area is welded to form the welded part 6, and the rim 2 and the disk 10 are joined together.

Welding the outside part 6 of the fitting area results in improved weld strength, compared to welding the inside part (a welded part 6b in FIG. 7) of the fitting area. The reason for this is the same as in the first embodiment of the present invention.

In the first embodiment, a part of the fitting area except for the part that faces the distal end of the spoke is not welded. In the second embodiment, a part of the fitting area that faces the distal end of the spoke is not welded.

In the present invention, the inside part of the fitting area may also be preferably welded in addition to the outside part of the fitting area in view of improving strength and rigidity.

Figure 9:
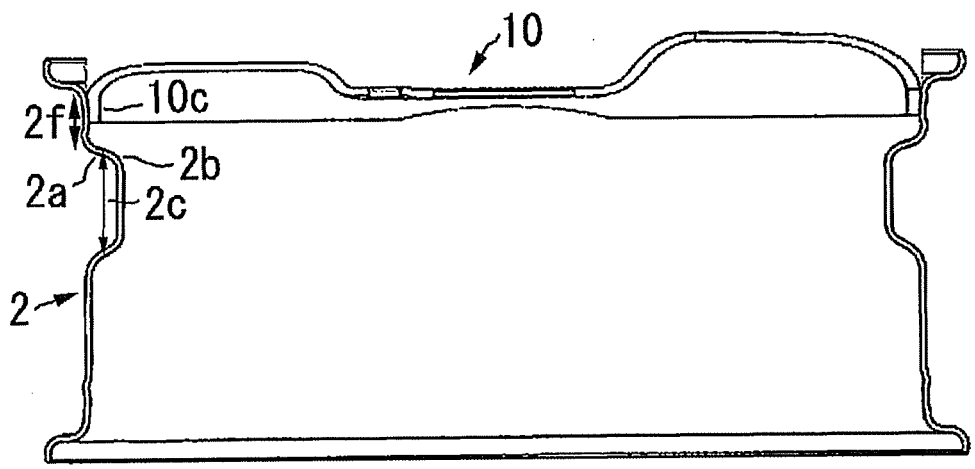
FIG. 9 is a sectional view showing an example in which the disk is fitted into a portion of the rim other than a drop portion.

As illustrated in FIG. 2 and FIG. 6, the disk flange 10c is fitted into the drop portion of the rim 2. However, as shown in FIG. 9, the disk flange 10c may be fitted into a different portion of the rim 2 from the drop portion, such as a bead seat 2f. Fitting the disk flange 10c into the bead seat 2f ensures a larger aesthetic surface of the wheel, compared to fitting the disk flange 10c into the drop portion 2c, and ensuring a larger internal space of the wheel for accommodating a brake and other components.

Figure 10:
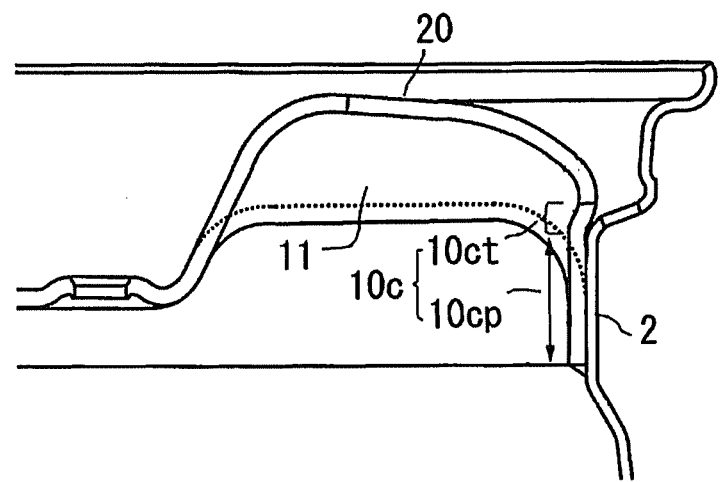
FIG. 10 is a sectional view of a fitting area between the rim and the disk according to another embodiment of the present invention.

Also, as shown in FIG. 10, the disk flange 10c may include a fitting disk flange part 10cp and a connecting disk flange part 10ct. The fitting disk flange part 10cp extends parallel to a corresponding fitting part of the rim 2. The connecting disk flange part 10ct connects to the reinforcing portion 11 of the spoke and to the decorative hole 20. In this case, the connecting disk flange part 10ct has, at its distal end, a diameter that increases toward the reinforcing portion 11 of the spoke and the decorative hole 20. The reinforcing portion 11 of the spoke and the decorative hole 20 are connected to the distal end of the connecting disk flange part 10ct.

Figure 11:
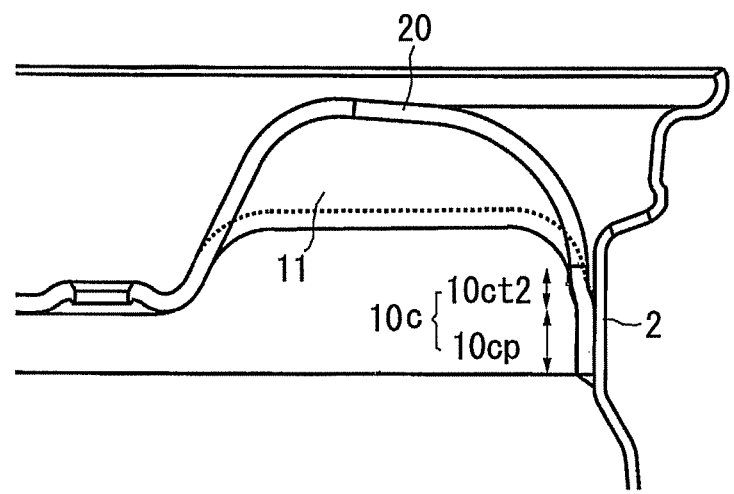
FIG. 11 is a sectional view of a fitting area between the rim and the disk according to still another embodiment of the present invention.

Also, as shown in FIG. 11, the disk flange 10c may include a fitting disk flange part 10cp and a connecting disk flange part 10ct2. The fitting disk flange part 10cp extends parallel to the corresponding fitting part of the rim 2. The connecting disk flange part 10ct2 connects to the reinforcing portion 11 of the spoke and to the decorative hole 20. In this case, the connecting disk flange part 10ct2 has, at its distal end, a diameter that decreases toward the reinforcing portion 11 of the spoke and the decorative hole 20. The reinforcing portion 11 of the spoke and the decorative hole 20 are connected to the distal end of the connecting disk flange part 10ct.

The present invention is not limited to the aforementioned embodiments. For example, the present invention is not limited to a specific shape of the spokes or to a specific shape of the decorative holes. In addition, the present invention is not limited to a specific number of the spokes or to a specific number of the decorative holes, as long as a plurality of the spokes and a plurality of the decorative holes are provided. Further, the present invention is not limited to a specific shape, a specific number, or a specific protruding direction of the reinforcing portions of the spokes. For example, the widthwise middle portion 13 of the spoke may be located outside in the wheel axial direction relative to the reinforcing portions 11. Furthermore, an additional hole may be formed on the spokes for weight reduction.

What is claimed is:

1. A wheel for a vehicle comprising:
a rim having a drop portion; and
a disk formed integrally from a plate material, the rim and the disk being welded together, wherein the disk has:
a hub mounting portion;
a plurality of spokes radially extending from the hub mounting portion toward an outer periphery of the disk and each of the spokes has a first reinforcing part and a second reinforcing part that are formed along the both widthwise ends of the spoke; and
a ring-shaped disk flange that is connected to the spokes through a curved-surface connecting portion that is formed by bending the spokes at an outer circumferential end thereof in a wheel axial direction, wherein the disk flange extends in the axial direction of the wheel, and a decorative hole is defined by the adjacent spokes, the hub mounting portion, and the disk flange,
wherein the rim and disk are welded at a fitting area between an inner circumferential surface of the rim and an outer circumferential surface of the disk flange wherein a weld is only at a part of the disk flange in a circumferential direction of the disk flange that faces a distal end of the spoke, which is defined as an area between the contact points where two extended lines of the widthwise ends of the spoke contact with the rim, while a part that faces a corner of the decorative hole and a part that is adjacent to the decorative hole are not welded,
wherein the weld is at an inside part of the disk flange in the wheel axial direction of the fitting area,
wherein the disk flange includes a fitting disk flange part which extends parallel to the corresponding fitting part of the rim, and a connecting disk flange part which connects to the first reinforcing part and the second reinforcing part of the spoke and to the decorative hole, the connecting disk flange part has, at its distal end, a diameter that decreases toward the first reinforcing part and the second reinforcing part of the spoke and the decorative hole, the first reinforcing part and the second reinforcing part of the spoke and the decorative hole are connected to the distal end of the connecting disk flange part.

2. The wheel for vehicle according to claim 1, wherein the outer circumferential surface of the disk flange is fitted into the inner circumferential surface of the drop portion of the rim.

3. The wheel for vehicle according to claim 2, wherein an outside part of the disk flange in the wheel axial direction of the fitting area is welded to the rim.

4. The wheel for vehicle according to claim 2, wherein the inside part of the disk flange in the wheel axial direction of the fitting area that is welded is welded to the rim.

5. The wheel for vehicle according to claim 2, wherein an outside end edge of the disk flange, being adjacent to the decorative hole in the wheel axial direction of the disk flange, is located inside relative to the outside end edge in the wheel axial direction of the drop portion of the rim.

6. The wheel for vehicle according to claim 1, wherein an outside end edge of the disk flange, being adjacent to the decorative hole in the wheel axial direction of the disk flange, is located inside relative to the outside end edge in the wheel axial direction of the drop portion of the rim.

7. The wheel for vehicle according to claim 1, wherein an outside end edge of the disk flange, being adjacent to the decorative hole in the wheel axial direction of the disk flange, is located inside relative to the outside end edge in the wheel axial direction of the drop portion of the rim.

8. A wheel for a vehicle comprising:
a rim having a drop portion; and
a disk formed integrally from a plate material, the rim and the disk being welded together, wherein the disk has:
a hub mounting portion;
a plurality of spokes radially extending from the hub mounting portion toward an outer periphery of the disk and each of the spokes has a first reinforcing part and a second reinforcing part that are formed along the both widthwise ends of the spoke; and a ring-shaped disk flange that is connected to the spokes through a curved-surface connecting portion that is formed by bending the spokes at an outer circumferential end thereof in a wheel axial direction, wherein the disk flange extends in the axial direction of the wheel, and a decorative hole is defined by the adjacent spokes, the hub mounting portion, and the disk flange, wherein the rim and disk are welded at a fitting area between an inner circumferential surface of the rim and an outer circumferential surface of the disk flange wherein a weld is only at a part of the disk flange in a circumferential direction of the disk flange that is adjacent to the decorative hole, while a part that faces a distal end of the spoke and a part that faces a corner of the decorative hole are not welded, wherein the weld is at an inside part of the disk flange in the wheel axial direction of the fitting area, wherein the disk flange includes a fitting disk flange part which extends parallel to the corresponding fitting part of the rim, and a connecting disk flange part which connects to the first reinforcing part and the second reinforcing part of the spoke and to the decorative hole, the connecting disk flange part has, at its distal end, a diameter that decreases toward the first reinforcing part and the second reinforcing part of the spoke and the decorative hole, the first reinforcing part and the second reinforcing part of the spoke and the decorative hole are connected to the distal end of the connecting disk flange part.

9. The wheel for vehicle according to claim 8, wherein the outer circumferential surface of the disk flange is fitted into the inner circumferential surface of the drop portion of the rim.

10. The wheel for vehicle according to claim 8, wherein an outside part of the disk flange in the wheel axial direction of the fitting area is welded to the rim.

11. The wheel for vehicle according to claim 8, wherein the inside part of the disk flange in the wheel axial direction of the fitting area that is welded is welded to the rim.

12. The wheel for vehicle according to claim 8, wherein an outside end edge of the disk flange, being adjacent to the decorative hole in the wheel axial direction of the disk flange, is located inside relative to the outside end edge in the wheel axial direction of the drop portion of the rim.

13. The wheel for vehicle according to claim 8, wherein an outside end edge of the disk flange, being adjacent to the decorative hole in the wheel axial direction of the disk flange, is located inside relative to the outside end edge in the wheel axial direction of the drop portion of the rim.

* * * * *